(No Model.) 4 Sheets—Sheet 1.

O. B. PECK.
CENTRIFUGAL SEPARATOR.

No. 560,632. Patented May 19, 1896.

Witnesses
Inventor
Orrin B Peck (No Model.) 4 Sheets—Sheet 2.
O. B. PECK.
CENTRIFUGAL SEPARATOR.

No. 560,632. Patented May 19, 1896.

WITNESSES
Chas. V. Gooding.
S. H. Cobb.

INVENTOR
Orrin B. Peck (No Model.) 4 Sheets—Sheet 4.

O. B. PECK.
CENTRIFUGAL SEPARATOR.

No. 560,632. Patented May 19, 1896.

Witnesses_
Chas. L. Gooding.
S. H. C...

Inventor_
Orrin B. Peck

UNITED STATES PATENT OFFICE.

ORRIN B. PECK, OF CHICAGO, ILLINOIS.

CENTRIFUGAL SEPARATOR.

SPECIFICATION forming part of Letters Patent No. 560,632, dated May 19, 1896.

Application filed October 31, 1894. Serial No. 527,576. (No model.)

*To all whom it may concern:*

Be it known that I, ORRIN B. PECK, a citizen of the United States, residing in Chicago, in the county of Cook and State of Illinois, have invented certain new and useful Improvements in Centrifugal Separators, of which the following is a specification.

The principal object of my improvements is to provide a centrifugal apparatus for effecting a more perfect and complete separation of materials of different degrees of specific gravity while in a finely-divided state, and to so construct the same as to enable the agitating parts thereof to be adjusted, as desired, to compensate for wear, and to enable said parts with their supports to be transversely reciprocated in service and to be readily removed and replaced. I attain this object by the mechanism illustrated in the accompanying drawings, in which—

Figure 1:
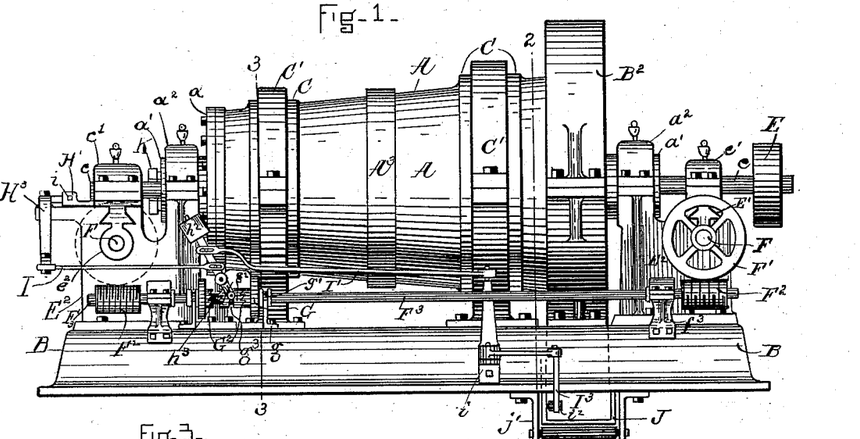
Figure 1 is a side elevation of the separator with one of the worm-wheels and other parts removed, the position of the former being shown in dotted lines.
Figures 2, 3, 4, 5:
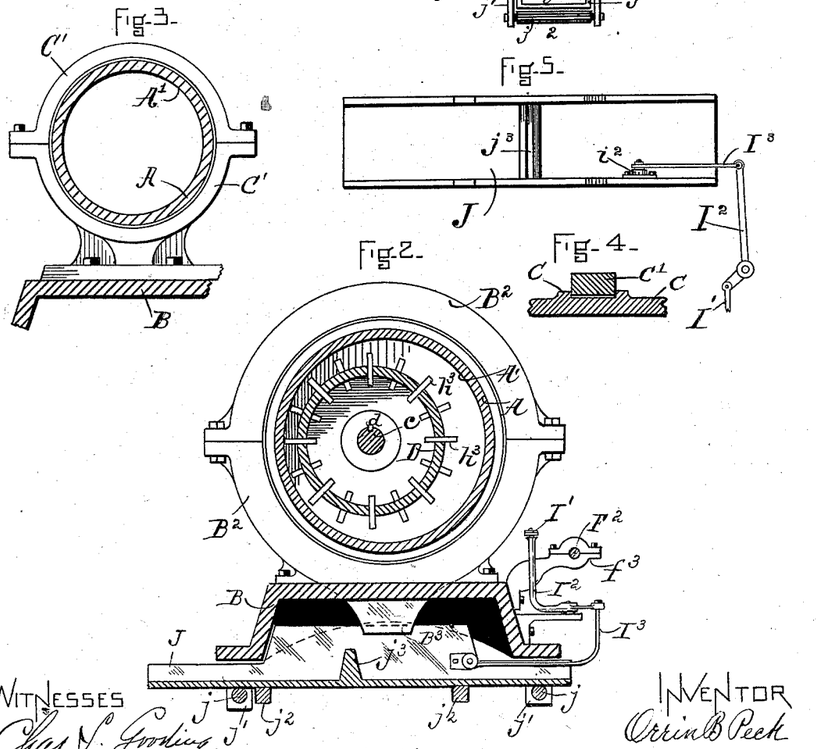
Fig. 2 is a transverse vertical section of Fig. 1 on the line 2 2, looking in the direction of the arrows.
Fig. 3 is a transverse vertical section of Fig. 1 on the line 3 3, parts being omitted, especially showing the position of the retaining-rings about the cylinder.
Fig. 4 is a vertical longitudinal section of a portion of the wall of the cylinder.
Fig. 5 is a top plan view of the sliding trough with its manipulating-levers.

The treatment vessel or cylinder A is provided with a separating-surface A' and is preferably provided with heads or ends $a$, having hollow trunnions $a'$, which are journaled in suitable boxes $a^2$ on the supporting-frame, preferably mounted on a base-plate B. This treatment vessel or cylinder, which for brevity will be termed a "treatment-cylinder" throughout the description and claims, may either be made conical in shape, as is particularly shown in Figs. 1 and 6, or cylindrical, as in Fig. 18. It is preferably provided with an encircling belt-surface $A^3$, and at or near the discharge end with an enlarged portion, forming an interior annular recess or channel B', from which discharge-orifices $b$ radiate. Surrounding the enlarged portion and provided with an annular channel $b'$, through its inner wall, is a trough or hood $B^2$, which is also provided with a discharge-passage $B^3$. This hood is so located, as shown in Figs. 1 and 2, that the channel $b'$ will be in radial alinement with the discharge-orifices of the treatment-cylinder. Within the hood opposite the channel and throughout a large portion of its circumference is provided an inwardly-extending rib $b^2$, terminating in a thin or narrow edge, which serves to deflect the water and material thrown into the hood to its sides and to facilitate its discharge by preventing its massing together opposite the channel $b'$ and falling back therethrough from above. Under the discharge-passage from the hood is preferably located a sliding trough J, which will be hereinafter more fully described.

To insure greater safety in operating the treatment-cylinder at a high velocity and to prevent great damage in case of accident, it is preferably provided around its outer circumference near its ends with two pairs of encircling ribs C, forming an annular channel between them, as particularly shown in Figs. 1 and 4. Between each set of these ribs, preferably but a short distance out of frictional contact with the treatment-cylinder, is a ring C' made in two parts and securely fastened to the base-plate, as particularly shown in Fig. 3, the two parts of the ring being suitably secured together by bolts or otherwise.

The trunnions of the treatment-cylinder are comparatively large and are preferably mounted in their boxes with antifriction metal, which is liable to be melted out during the operation through the heat generated by the friction of the trunnions, or the trunnions might break while in service. In either case, were it not for the rings C', which will be termed "retaining-rings" or "auxiliary supports," the treatment-cylinder would be free to be thrown with great momentum from its position, and especially when a surrounding caisson is not used it would not only greatly damage or destroy itself, but be very dangerous to persons who might be near it. By the use of the retaining-rings, if the metal in the journal-boxes becomes melted or from other causes the revolving cylinder begins to move from its proper position, it will soon come into contact with the rings C' and will not only be retained closely to the proper alinement, doing slight damage and without danger, but by its frictional contact with the ring its velocity of rotation will be greatly lessened or will be wholly stopped. The ribs C prevent an endwise movement of the treatment-cylinder through the rings at such times, but they are not absolutely essential, though desirable, and if used it is not necessary to have two ribs at each end of the cylinder, as one rib at each end, properly located with respect to the retaining-ring, will serve the desired purpose. The rings need not necessarily be made as illustrated, only so as to prevent wide movement of the cylinder out of alinement.

Within the treatment-cylinder, supported on a shaft $c$ extending through the hollow trunnions and suitably journaled at or near its ends in boxes $c'$, is a deflector D, which is made in sections, as shown in Figs. 1, 6, 7, and 18. These sections or drums D' are slid on a shaft, so that their respective edges abut against each other, thereby forming an entire cylinder or deflector. The drums may be held from turning on the shaft by splines $d$ or other suitable means and may be further held in place and in close contact by a disk or flange $D^2$ at one end, with its hub preferably abutting against a shoulder $d'$ on the shaft formed by an enlargement thereof. One of the sides of the disk, near its outer diameter, contacts with one edge of the rim of the section next to it. At the opposite end of the several sections may be provided another disk or flange $D^3$, contacting in a like manner with the edge of the section next to it. This disk has its hub in contact with a nut $d^2$, which serves to force it against the rim of the section with which it is in contact, thereby holding the rim of each successive section against the one next to it. In this way the several sections will be held rigidly between the flanges, and the edges being turned true and of the proper dimension at each end to correspond with that edge of the section with which it contacts there will be a continuous sectional cylinder or deflector formed, which will either have parallel sides or be conical, depending on which way the sections may be designed. By the removal of the pulley E and the nuts $d^2$ and $d^3$, the latter of which is provided as a jamb-nut to insure tightness, the several sections of the deflector may be readily removed from the shaft when it is out of the treatment-cylinder.

The outer surface of the several drums forming the deflector is provided with perforations $e$, in which are studs $h^3$. These studs are preferably provided with threads throughout a considerable portion of their length from one end and are screwed in holes or perforations with their outer ends extending the proper distance toward the separating-surface. As these studs become worn at their outer ends in service they may be adjusted farther out to compensate for such wear. By this arrangement one set may be used for a much longer time than if they were provided with but short threads and were incapable of adjustment, the former condition resulting in great convenience and economy.

Figure 14:
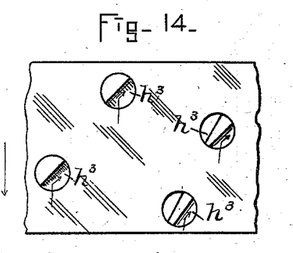
Fig. 14 is an enlarged detail view of a portion of the surface of the agitating-cylinder, showing the agitators or plows.
Figure 15:
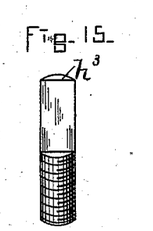
Fig. 15 is an enlarged perspective detail of one of the agitating-studs.
Figure 16:
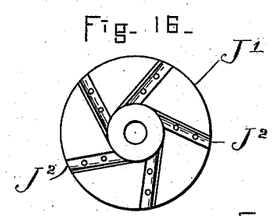
Fig. 16 is an end elevation of the deflector at the head end of the separator.

The outer or service ends of the studs are preferably made in such a form as to serve as plows as well as agitators to plow or deflect any excess of material on which they operate toward the discharge end of the treatment-cylinder. This may be accomplished by flattening them on one or both sides and setting them in the deflector in such a position that their flattened side will be at an angle to the path of rotation. This position is shown in Fig. 14, the arrows showing the manner of deflection of material, and the large arrow at the left of the figure the relative direction of travel of the studs with respect to the treatment-cylinder. It will be understood that it is necessary to set the studs at such an angle that the flattened obliquely-set side will plow the material toward the discharge end of the treatment-cylinder. In several figures of the drawings the flattened shape and oblique position of the agitating-studs are not shown, as they are so small that their shape cannot be readily distinguished; but it is preferable to use them as shown in Figs. 14 and 15 or otherwise of a shape and in a position to deflect material toward the point of discharge.

Figure 7:
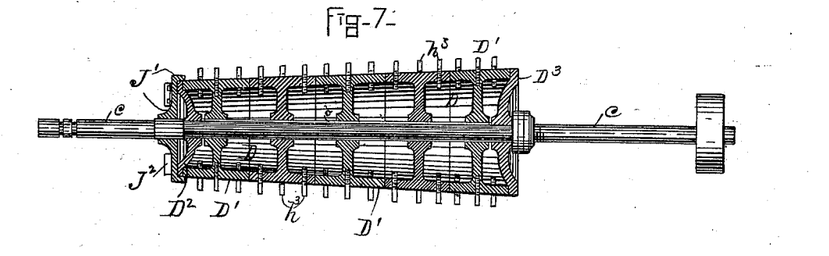
Fig. 7 is a longitudinal section of the deflector or agitating-cylinder.
Figure 10:
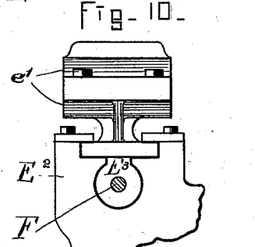
Fig. 10 shows a modified form of the same.

As shown in Fig. 7, the shaft $c$ is provided near one end with annular recesses in which fit corresponding projections in its box to maintain its desired longitudinal position, and at the other end it is extended sufficiently to receive the driving-pulley E, through which rotation is imparted to the agitating-cylinder. This shaft is journaled in boxes $c'$ $c'$, which are preferably mounted to slide in channels or ways E' transversely to the axis of rotation of the shaft and toward and from the separating-surface. These channels may be made in dovetailed shape, as shown in Fig. 1, or with straight rectangular sides, as illustrated in Fig. 10, or in any other desired way to guide and retain the boxes in proper position and admit of the desired movement. Preferably under the lower side of each of these boxes, in a space or channel $e^2$ in the supporting-bracket $E^2$ and passing through depending screw-threaded nuts $E^3$, secured to the under side of the box, is a rotatable threaded rod F, supported in boxes $f$ and held from longitudinal movement by collars and nuts $f'$ $f^2$ or other suitable means. One end of each rod is extended sufficiently to receive a rigidly-mounted worm-wheel F'. These worm-wheels F' engage worm-gears $F^2$ on a shaft $F^3$, which is rotatably supported in a bearing $f^3$ in a position parallel to the axis of the deflector-shaft, somewhat above the base-plate. On this shaft are loosely mounted two belt-pulleys G G', maintained in position by studs $g$, projecting into annular channels $g'$ in the extended hubs of the pulleys.

The pulleys G G' are rotated in opposite directions, and their inner hubs are provided with oppositely-inclined cam-surfaces $G^2$, which are adapted to engage similar surfaces on the opposite ends of a sleeve $g^2$, splined on the shaft $F^3$ between the pulleys. The sleeve slides freely on the shafts, but compels its rotation. It is provided with a channel $g^3$ near its central circumference, into which extend studs from the depending arms $h$ of a lever H. This lever is pivoted at a point below its center to a supporting-bracket $h'$ and is preferably provided with a weight $h^2$ near its upper end, so that when the lever is tilted in one direction or the other, so that the weight has passed over the center of pivotal support it will fall by gravity a predetermined distance, carrying the lever and sliding the sleeve in one direction or the other, thus bringing the cam-surfaces on one of its ends into engagement with the cam-surfaces of the appropriate pulley-hub. The sleeve will therefore be rotated in one direction or the other, and through its connection by the spline will rotate the shaft $F^3$, and through the worms $F^2$ and worm-wheels F' will turn the threaded rods F, which, by reason of their engagement with the nuts $E^3$, will move the boxes $c'$, the shaft $c$, and deflector D in one direction or the other transversely to the axis of rotation. This causes the ends of the studs $h^3$ to approach nearer to or recede farther from that side of the separating-surface over which they are to act.

Figure 6:
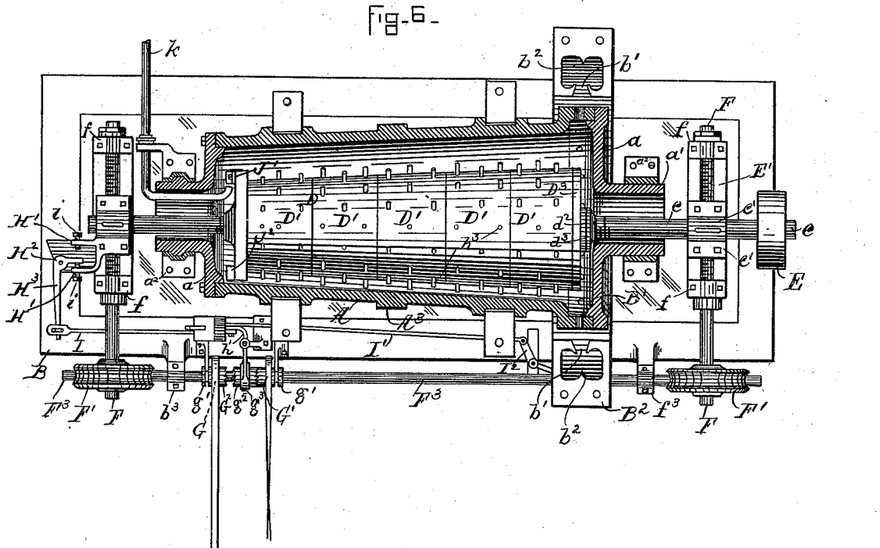
Fig. 6 is a somewhat-reduced top plan view of the separator, certain portions being in section.
Figure 8:
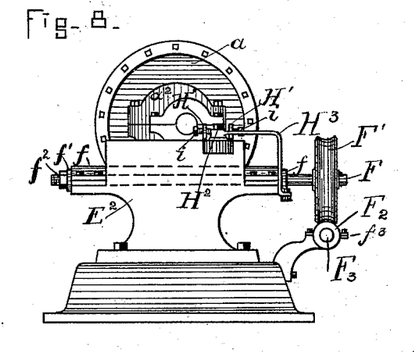
Fig. 8 is an end elevation of Fig. 1.
Figure 9:
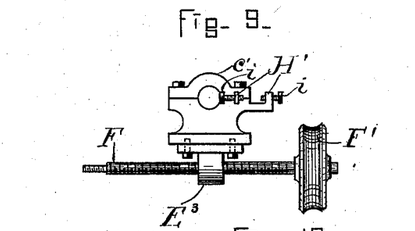
Fig. 9 is a detail view, in end elevation, of one of the traveling journal-boxes and certain actuating parts.

On one of the traveling boxes are preferably two arms H' H', which extend a short distance apart in the same horizontal plane as shown in Figs. 6, 8, and 9. Through these arms project set-screws $i$, with their points extending inward, adapted to be adjusted through the arms. Pivotally fulcrumed at a point $H^2$ to a stationary part of the supporting-frame is a bent lever $H^3$, with its short arm extending between the set-screws $i$, as particularly shown in Fig. 8. When the set-screws have been adjusted to the desired relative positions, the end of one or the other will contact with the lever $H^3$, and as the traveling box carrying these set-screws moves it will carry the end of the lever with it. This movement of the short arm will swing the lower arm a greater distance, carrying with it a rod I, which is linked thereto, and through the rod I will move the lever H sufficiently to carry the weight $h^2$ the necessary distance past its pivotal support, when it will fall, carrying it with the lever. This slides the sleeve $g^2$ along the shaft $F^3$, disengaging it from the cam-surfaces on the hub of one pulley and bringing it into engagement with the cams on the hub of the other, which, as hereinabove stated, is being rotated in the opposite direction. By this arrangement the rotation of the sleeve will be reversed, changing the direction of rotation of the shaft $F^3$, and consequently through the interposed gearing the direction of transverse movement of the traveling boxes and the deflector. The connections between the levers and rods of this mechanism are made through sufficiently elongated or slotted holes to permit the weighted lever to be carried by the gravity of the weight far enough to effect the reversed motion desired.

The screws $i$ are to be adjusted through their supporting-arms to contact with the short arm of the lever $H^3$ at such a time during the operation of the separator that the weighted lever and its connecting parts will automatically reverse the transverse movement of the deflector, causing the agitating or plowing studs to be carried toward and from the separating-surface to the desired extent for the purposes hereinafter described. A greater movement may be secured by adjusting the points of the screws $i$ farther apart, and vice versa, and the travel of these parts may be effected through any particular portion of their path by relatively adjusting the positions of the screws in or out to effect the reverse movement when desired.

At a suitable place on the lever H is hinged one end of a rod I' through an elongated hole, the other end connecting with the upturned end of the short arm of an angular lever $I^2$, (see Figs. 1 and 2,) which is pivotally fulcrumed to a bracket $i'$, attached to the base. This lever $I^2$ is also pivoted at its opposite end to the upturned end of a rod $I^3$, which extends backward to a sliding trough J, to which it is attached at $i^2$. This trough is preferably supported transversely to the base-plate under the discharge-passage of the hood $B^2$ and rests on suitable rolls $j$, mounted in depending brackets $j'$, so that it is adapted to be freely slid back and forth endwise in either direction. The trough is preferably provided with stops $j^2$ on its lower side to limit its movement and is divided by a partition $j^3$ near its center sufficiently low to pass under the end of the hood as the trough is slid back and forth. The endwise movement of the trough is of sufficient extent to bring the partition either on one side or the other of the discharge-passage from the hood, so that the material and water therefrom will be deflected in either direction, as the position of the trough may determine. The sides of the trough near the center are preferably extended well up, so that the depending end of the hood will reach down between them to prevent the splashing out and loss of material.

It will be seen that by the connection of the trough through the levers and rods described above the trough will be automatically shifted in one direction or the other as the weighted lever falls, changing the direction of flow of material being discharged at the time, which change occurs at the time the direction of transverse travel of the deflector is automatically reversed.

Certain means have been disclosed for shifting the sliding trough and changing the direction of travel of the deflector; but I do not wish to confine myself to the exact details of construction, as various means can obviously be used to automatically accomplish the desired result.

Figure 17:
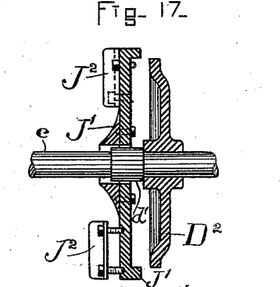
Fig. 17 is a transverse section of the same, showing a portion partly disconnected.

Preferably secured to the end of the deflector nearest the feed end of the treatment-cylinder and occupying the space between these two at this point is a disk or plate $J'$, having radial flanges or wings $J^2$ on its outer side, which in their revolution serve to force the water and material around as it is introduced, quickly subjecting it to the action of centrifugal force, and thereby promptly starting its flow through the treatment-cylinder toward the discharge end. The wings $J^2$ do not extend into the shaft on which their disk is carried, but preferably leave a sufficient space for the entrance of the end of a feed-conduit K, the discharge-orifice of which is so located as to deliver the material quickly into the field of action of the wings and toward the separating-surface. The plate $J'$ also serves to protect the end of the deflector from wear by the abrasion of material being introduced. For this purpose one edge of the plate may be flanged, as particularly shown in Fig. 17, to closely fit over the outer edge of the disk on the end of the deflector next to it.

Figure 11:
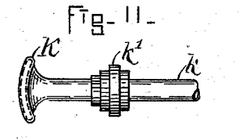
Figs. 11 and 12 are detail views of the feed pipe or conduit.
Figure 12:
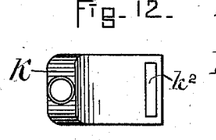
Figure 13:
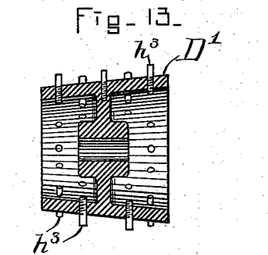
Fig. 13 is a longitudinal section of one of the sections composing the deflector.

The trunnions $a$ are made with a sufficiently-large opening to not only admit of the passage of the shaft $c$, but also to allow the transverse movement of the shaft and to admit the entrance of feed pipe or conduit K to the treatment-cylinder. This conduit is supported by a bracket $k^5$ and may be made in any desired manner to effect the introduction of material, but preferably, as particularly shown in detail in Figs. 11 and 12, being an angular flattened metal shell terminating at one end in a contracted portion to unite with a feed-pipe $k$. This connecting-pipe may be attached by a union $k'$ or in any convenient way, and the flattened portion that is extended into the trunnion is preferably made concave on one side and convex on the other to conform to the shape of the passage between the shaft and the inner side of the trunnion. This portion of the feed-conduit is of sufficient length to extend through the trunnion and bring its discharge-passage $k^2$ (illustrated in Fig. 12) into the space between the end of the deflector and the treatment-cylinder. The transverse movement of the shaft and deflector is toward and from one side of the treatment-cylinder from the axis of rotation, and consequently does not traverse the space within the trunnion occupied by the conduit.

Figure 18:
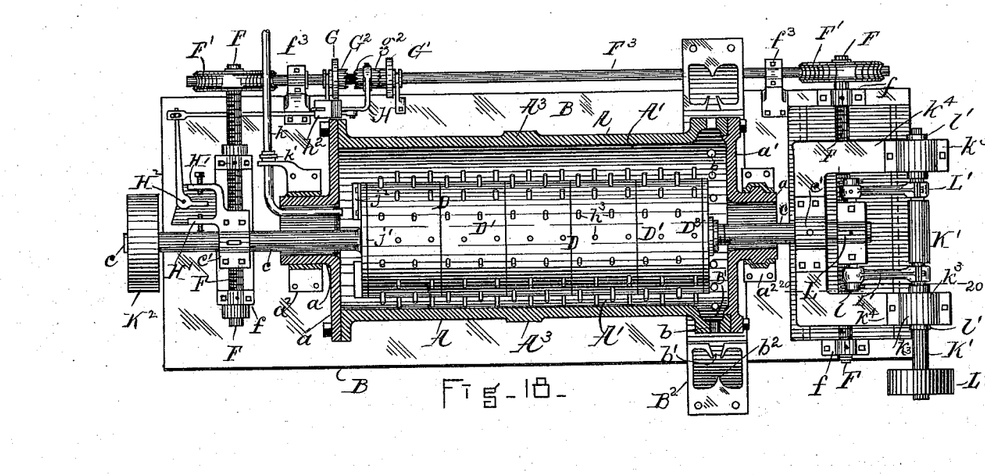
Fig. 18 is a top plan view of a cylindrical modification, showing the treatment vessel in section.
Figure 19:
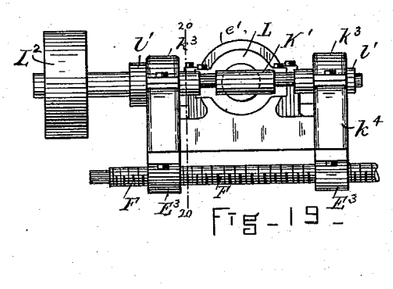
Fig. 19 is a detail end elevation of one of the traveling journal-boxes and some actuating parts somewhat enlarged.
Figure 20:
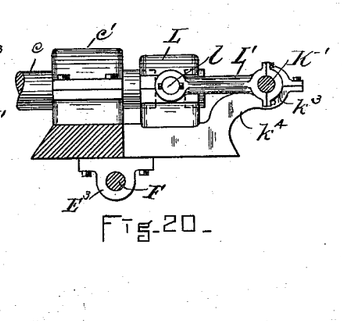
Fig. 20 is a transverse sectional view of Fig. 19 on the line 20 20, showing a connecting-bar and some other parts in elevation.
Figure 21:
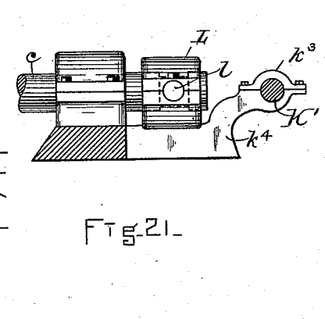
Fig. 21 is similar to Fig. 20, but somewhat smaller, with the connecting-bars removed.

In Fig. 18 is shown a modification with the separating cylinder and deflector with parallel sides, instead of being conical. The shifting mechanism and many other parts in this modification are similar to those in the figures already described. The sliding trough and automatic shifting mechanism have not been illustrated, and the automatic means for changing the direction of transverse travel of the sliding journals and parts carried by them is located on the opposite side of the separator. In addition to the gradual transverse movement of the deflector with its studs these parts are given at the same time a reciprocating movement in a longitudinal direction, which enables the studs to more effectually cover the separating-surface and assist in evenly distributing the material passing through the cylinder or lodging therein, thereby securing a more perfect separation of heavier and lighter substances. To effect this latter reciprocating movement the base of the sliding journal $c^2$ at the discharge end of the separator is made of a sufficient size to permit a suitable crank-shaft $K'$ to be journaled in boxes $k^3$, mounted thereon, upon upwardly and backwardly extending brackets $k^4$, to give the desired space for the adjacent parts. The shaft $c$ is not provided with recessed journals or other means for preventing longitudinal movement, but is capable of sliding freely a short distance. At the feed end of the separator the shaft is extended through its journal-box sufficiently to receive a belt-pulley $K^2$, by means of which it is rotated. The opposite end of the shaft is provided with annular grooves or recesses and is extended to rotatably engage a box L, provided with internal projections to engage the grooves on the shaft. By this arrangement as the box L is moved back and forth the shaft c and the parts supported and rotated by it will be similarly reciprocated. The box L is provided at each side with a suitable trunnion l, extended to engage with one end of connecting-bars L', the other end of which is connected to the eccentric or crank portion of a crank-shaft K', rotated by a pulley L², thereby imparting an endwise reciprocation to the shaft, deflector, and agitating-studs. Collars l' insure the proper longitudinal position of the shaft K'. By this arrangement the deflector carrying the agitators or plows is simultaneously given a rotary motion, a gradual movement transverse to its axis of rotation, and a more rapid reciprocation lengthwise or in a direction transverse to the path of rotation.

The operation of these separators is in successive alternations of separating and accumulating a desired quantity of heavier material while discharging the lighter portions, and then removing the accumulated heavier, diverting the two to different places of deposit. The treatment cylinder and deflector are rotated at a relatively greater or less speed, as will suit the particular conditions existing. The material to be separated is introduced through the feed pipe or conduit, preferably in a finely-divided state, and mixed with a considerable amount of water, so it will flow through the separator freely.

At the beginning of the operation of separating and accumulating a layer of heavier material the sliding boxes are in a position sufficiently near the side of the treatment-cylinder to bring the agitators close to the separating-surface, thereby stirring and agitating the material on or near the surface, plowing it toward the discharge end of the cylinder, and assisting the water and centrifugal force to separate the lighter and heavier portions and to discharge the former. The position and movement of the parts are so adjusted that at or slightly before the beginning of the separating period when the ends of the studs have approached sufficiently near the separating-surface the weighted lever H will have been moved sufficiently to fall on the opposite side of its pivotal support and through the intermediate mechanism will automatically reverse the position of the sliding trough and the direction of travel of the deflector. The deflector receding slowly from the separating-surface gradually removes the field of action of the agitators or plows from the same, permitting an accumulation or layer of material to gradually form, and as the heavier substances are held by centrifugal force most firmly to the separating-surface this portion forms the layer, while the lighter portions, aided by the agitator, pass toward the end of the cylinder and are discharged. This direction of travel of the parts, and the consequent accumulation of the heavier material, continues to such extent as has been predetermined by the adjustment of the automatic reversing means at which time a reversal takes place, and the direction of transverse movement of the deflector will again occur and carry the agitating-studs close to the separating-surface, loosening and plowing the accumulated heavier material toward the discharge end of the cylinder. When the studs have reached the predetermined initial point for separation, the heavier substances will have been sufficiently removed to again commence the separating period. It is preferable to stop the flow of material into the cylinder during the removal of the heavier substances or unloading period. The rapidity of movement of the agitator from the side of the treatment-cylinder and also the feed of material should be so adjusted with reference to the percentage of heavier substances contained in the material or to the percentage of material it is desired to save that the agitators will recede from the separating-surface or initial point sufficiently fast to permit such quantity to accumulate.

It is preferable to revolve the treatment cylinder and deflector at different speeds to increase the action of the agitating and plowing means, such differential rotation being of a degree to best suit the material being treated. The transverse travel of the deflector is preferably faster during the unloading period than during the separating and loading period. This may be accomplished by running the belts or other driving mechanism for effecting the outward travel at a greater speed, securing a more rapid unloading of heavier material and effecting a saving of time. The agitators not only, as hereinabove explained, disturb the material coming within their field of action, assisting the water and centrifugal force to effect separation and plowing material toward the discharge end of the treatment-cylinder, but they maintain a uniform surface over the accumulating layer, immediately filling any channels or grooves resulting from the erosion of the surface by the flow of water or wholly preventing their tendency to form.

From the fact that the field of action of the agitation is only over a portion of the separating-surface at a time the material is alternately subjected to the action of water and centrifugal force alone, and then to the combined action of the agitators or plows and water and centrifugal force, the separating-surface, at each rotation of the treatment-cylinder, passing completely through the field of action of the agitators and that of the unobstructed action of the water.

While it is preferable to use automatic means for reversing the direction of transverse travel of the agitating and other parts, and mechanical means for gradually and uniformly moving them, this is not necessary, and I therefore do not desire to be restricted to details in these respects. Nor is it essential that the sectional deflector for maintaining and revolving the agitating and plowing devices be made up of drums, as removable sections may be made in various forms and still embody substantially my invention.

The term "treatment-cylinder" is generally used throughout the description; but the treatment vessel need not necessarily be made in the form of a cylinder, but may be of any desired shape adapted to receive the necessary parts and subserve the purpose required.

What I regard as new, and desire to secure by Letters Patent, is—

1. In a centrifugal separator, the combination of a rotatable treatment vessel, and a rotatable deflector located therein carrying agitating means, and the axis of which is movable toward and from the separating-surface, substantially as described.

2. In a centrifugal separator, the combination of a rotatable treatment vessel, means to effect agitation of material therein movable transversely to the axis of rotation, and traveling journal-boxes for supporting such agitating means, substantially as described.

3. In a centrifugal separator, the combination of a rotatable treatment vessel, means to effect agitation of material therein movable transversely to the axis of rotation, traveling journal-boxes for supporting such agitating means, and automatic means for effecting the transverse movement of said boxes, substantially as described.

4. In a centrifugal separator, the combination of a rotatable treatment-cylinder provided with hollow trunnions on which it is journaled, movable agitating means within said cylinder, and a transversely-movable supporting-shaft extending through the trunnions and journaled outside the cylinder, substantially as described.

5. In a centrifugal separator, the combination of a rotatable treatment-cylinder provided with hollow trunnions on which it is journaled, movable agitating means within said cylinder, a transversely-movable supporting-shaft extending through the trunnions and journaled outside the cylinder, and automatic means for effecting the transverse movement, substantially as described.

6. In a centrifugal separator, the combination of a rotatable treatment vessel, means to effect agitation of material therein movable transversely to the axis of rotation, and reciprocating journal-boxes for supporting such agitating means, substantially as described.

7. In a centrifugal separator, the combination of a rotatable treatment vessel, means to effect agitation of material therein movable transversely to the axis of rotation, and journal-boxes for supporting said agitating means geared to a shaft alternately rotated in opposite directions, substantially as described.

8. In a centrifugal separator, the combination of a rotatable treatment vessel, means to effect agitation of material therein movable transversely to the axis of rotation, journal-boxes for supporting said agitating means geared to a shaft alternately rotated in opposite directions, and automatic means for effecting this reverse rotation, substantially as described.

9. In a centrifugal separator, the combination of a rotatable treatment vessel, means to effect agitation of material therein movable toward and from the separating-surface, means for causing this movement, and contact-arms carried with the agitator to intermittently actuate reversing mechanism, substantially as described.

10. In a centrifugal separator, the combination of a rotatable treatment vessel, means to effect agitation of material therein movable toward and from the separating-surface, means for causing this movement, and adjustable contact portion carried with the agitator to actuate reversing mechanism, substantially as described.

11. In a centrifugal separator, the combination of a rotatable treatment vessel, rotatable means to effect agitation of material therein axially movable toward and from the separating-surface, and automatic means for accomplishing this movement which is capable of adjustment to vary the length of travel in either direction, substantially as described.

12. In a centrifugal separator, the combination of a rotatable treatment vessel, and means to effect agitation of material therein the axis of which is movable toward and from the separating-surface, and which is at the same time movable longitudinally of its axis, substantially as described.

13. In a centrifugal separator, the combination of a rotatable treatment vessel, and rotatable means to effect agitation of material therein the axis of which is movable toward and from the separating-surface, and which is at the same time movable longitudinally of its axis, substantially as described.

14. In a centrifugal separator, the combination of a rotatable treatment vessel, means to effect agitation of material therein, and automatic means for moving the axis of the same toward and from the separating-surface, and which is at the same time movable longitudinally of its axis, substantially as described.

15. In a centrifugal separator, the combination of a rotatable treatment vessel, a cylinder or deflector therein, a supply-conduit extending into the vessel in proximity thereto, and a removable plate interposed between said conduit and the end of the deflector, substantially as described.

16. In a centrifugal separator, the combination of a rotatable treatment vessel, a cylinder or deflector therein, a supply-conduit extending into the vessel in proximity thereto, a removable plate interposed between said conduit and the end of the deflector, and projecting wings or flanges carried thereby, substantially as described.

17. In a centrifugal separator, the combination of a rotatable treatment vessel, orifices or outlets therein, and a trough or hood surrounding the orifices provided with a rib against which material is discharged, substantially as described.

18. In a centrifugal separator, the combination of a rotatable treatment vessel, discharge-passages therefrom, a divided horizontal trough movably supported beneath said passages, and automatic means for reciprocating the same, substantially as described.

ORRIN B. PECK.

Witnesses:
 JNO. WHITE,
 O. RICH.

It is hereby certified that Letters Patent No. 560,632, granted May 19, 1896, upon the application of Orrin B. Peck, of Chicago, Illinois, for an improvement in "Centrifugal Separators," were erroneously issued to said Orrin B. Peck as sole owner of the invention; whereas said Letters Patent should have been issued to *The Patent Title Company, of same place*, said The Patent Title Company being assignee, by mesne assignments, of the entire interest in said invention, as shown by the assignments of record in this Office; and that the said Letters Patent should be read with this correction therein that the same may conform to the record of the case in the Patent Office.

Signed, countersigned, and sealed this 23d day of June, A. D. 1896.

[SEAL.]

JNO. M. REYNOLDS,
*Assistant Secretary of the Interior.*

Countersigned:
    S. T. FISHER,
        *Acting Commissioner of Patents.*